Feb. 27, 1940.   A. H. BREITBARTH ET AL   2,192,024
COLLET CHUCK
Filed Oct. 4, 1938

WITNESSES

INVENTORS
August H. Breitbarth
and Harry Anderson
BY
ATTORNEYS

Patented Feb. 27, 1940

2,192,024

UNITED STATES PATENT OFFICE 2,192,024

COLLET CHUCK

August H. Breitbarth and Harry Anderson, Valparaiso, Ind.

Application October 4, 1938, Serial No. 233,230

2 Claims. (Cl. 279—51)

This invention relates to chucks, and more particularly to collet chucks which are used on lathes, milling, grinding and similar types of machines, to hold the material to be worked.

Various types of chucks have been used in the past, and an object of this invention is to provide a chuck simple in operation, economical in construction, and one which will hold the material to be worked in a firm grip.

A further object of the invention is to provide a collet chuck in which the changing of the collet is simplified and speeded up.

In the accompanying drawing—

Figure 1:
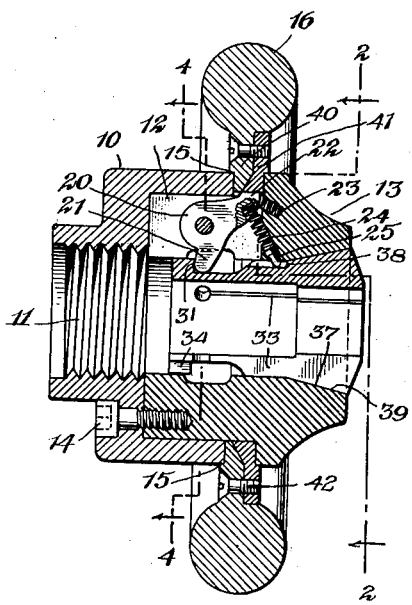
Fig. 1 is a cross sectional view of a device embodying our invention, taken on the line 1—1 of Fig. 2.
Figure 2:
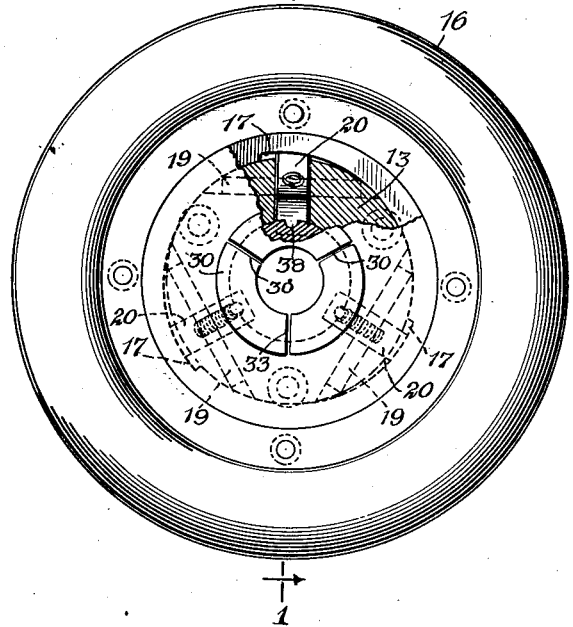
Fig. 2 is a plan view partly in cross section.
Figure 3:
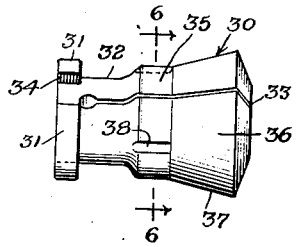
Fig. 3 is a view of a collet suitable for use in our chuck.
Figure 4:
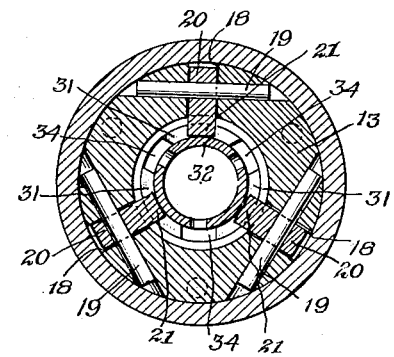
Fig. 4 is a cross sectional view taken on the line 4—4 of Fig. 1.
Figure 5:
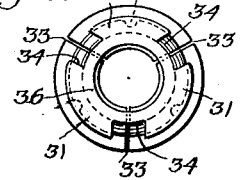
Fig. 5 is a rear view of the collet shown in Fig. 3.
Figure 6:
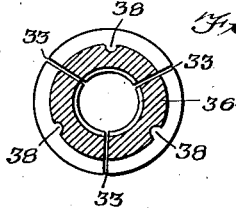
Fig. 6 is a cross sectional view of the collet taken on the line 6—6 of Fig. 3.

Referring more particularly to the drawing, we provide a housing 10 which is threaded at its rear end 11 for adaption to the machine upon which it is to be used. The housing 10 is undercut at its front end to form a cavity 12 adapted to receive and position a forward housing 13. A screw 14 extends through the housing 10 into the housing 13 to hold the two together.

Between the two housings is an annular channel 15 adapted to receive a cammed hand wheel 16. The hand wheel 16 has on its inner surfaces cammed sections 17, two or more in number. The housing 13 contains a plurality of slots 18 running at right angles and coinciding with the cammed surfaces 17. Pivoted in these slots by means of the pins 19 are dogs 20. The dogs 20 are substantially triangular in shape, the pivot being at one angle thereof and having extended through the inner surface of the housing 13 fingers 21 constituting another point of the triangle. The third point of the triangle consists in the arm 22 adapted to engage the cammed surfaces 17 of the hand wheel 16.

A spring 23 seated in the housing 13 engages the end of the dog 20 to hold it against the cammed surface, and an additional spring 24 is seated in the housing 13 and contacts the dog 20 at one end and a pin 25 extending into the center of the housing 13 at its other end.

A collet 30 is provided, having a collar 31 and an annular depressed portion 32. The collet forwardly of the collar 31 is cut through one or more places 33 in order to provide for expansion and contraction. The collar 31 is provided with a plurality of grooves 34 to allow the collet to be inserted into the housing 13 past the pins 25, the position of which coincides with the grooves 34.

Forwardly of the depressed portion 32 is a bearing surface 35 and forwardly of that are the jaws 36, the circumference of which increases to the outer end to give an angle surface 37. The bearing surface 35 is provided with a plurality of grooves 38.

The inner portion of the housing 13 has an angular surface 39 which, when the collet is inserted in the housing, contacts the surface 37.

In operation the hand wheel is turned so the cammed surface 17 will exert the least possible pressure on the arm 22 and the collet is inserted in the housing 13 so that the pins 25 pass through the grooves 34. The collet is then turned until the pins 25 slip into the grooves 38 where they hold the collet against accidental turning. By turning the hand wheel 16 toward the operator or in a counter-clockwise direction, the cammed surface 17 will exert pressure on the arm 22 causing the dog 20 to pivot on the pin 19 and to exert pressure through the arm 21 against the collar 31, forcing the collet rearwardly into the housing 13. The tapered surface 39 will then exert pressure against the surface 37 of the jaws 36 causing them to close and grip the material placed between the jaws by the contraction of said jaws.

It will thus be seen that in inserting or changing a collet, the operator needs only to move the hand wheel 16 a very short distance to release it and to tighten the pressure against the dogs 20 which in turn cause the contraction of or allows the expansion of the jaws 36 of the collet 30. In changing the collet by turning the hand wheel 16 a short distance in a clockwise direction, pressure on the arm 22 of the dog 20 is released and the springs 23 and 24 relieve the pressure from the collar 31. This likewise releases the pressure on the spring 24 so that the pin 25 may be sprung out of the groove 38, the collet turning until the pin 25 coincides with the groove 34, and removed from the chuck.

It will be seen that by the use of this device a strong pressure may be exerted against the jaws of the collet by a simple operation of the hand wheel, and the collet 30 will more firmly hold the material to be worked.

While the hand wheel 16 may be constructed of a single piece, we have found that an additional advantage exists in making it of two pieces. It will be seen from the drawing that the wheel is constructed of an outer section 40 and an inner section 41 held together by a screw 42. The section 41 directly contacts the arm 22 and may contain the cammed surfaces. It may be made of harder material than the balance 40 of the wheel 16 and by such construction it would not be necessary to cam the portion 40.

It will also be appreciated that, while in the drawing we have shown one type of collet, many and varied types of collets and other tools may be used with this chuck by providing them with the collar 31, and the conventional collet may be used by the addition of a loose threaded collar which may either be placed back of the dogs 21 and held in place by dowel pins or which may be provided with the groove 34 and placed on the end of the collet before insertion into the chuck.

We claim:

1. A device of the character described, including a chuck, dogs in said chuck with arms extending through said chuck, a wheel having an internally cammed surface mounted on said chuck and cooperating with one end of said dogs, whereby the turning of the wheel will cause said cammed surface to exert pressure on said dogs and to move said arm rearwardly, spring members cooperating with said dogs and with a pin extending into the interior of said chuck, a collet having a collar at its rearward end adapted to be engaged by said arms, and grooves in said collar and additional grooves on the outer surface of said collet, said grooves in the collar being adapted to allow the collet to be passed by said arms and said grooves on the surface of the collet and being adapted to engage said pins after the insertion of the collet into the chuck to prevent accidental turning thereof.

2. In a device of the character described, including a chuck, dogs in said chuck with arms extending through said chuck, a wheel having cam surfaces mounted on said chuck and cooperating with one end of said dogs, whereby the turning of the wheel will cause said cam surfaces to exert pressure on said dogs and to move said arms rearwardly, spring members cooperating with said dogs and with a pin extending into the interior of said chuck, a collet having a collar on its rearward end adapted to be engaged by said arms, and grooves in the outer surface of said collet adapted to engage said pins after the insertion of the collet into the chuck to prevent the accidental turning thereof.

AUGUST H. BREITBARTH.
HARRY ANDERSON.